US006762854B1

(12) United States Patent
Murakami et al.

(10) Patent No.: US 6,762,854 B1
(45) Date of Patent: *Jul. 13, 2004

(54) METHOD AND APPARATUS FOR DETERMINING CONSUMED AMOUNT OF RECORDING MATERIAL

(75) Inventors: Yutaka Murakami, Yokohama (JP); Kunio Okada, Kawasaki (JP); Akio Sugaya, Yokohama (JP); Takeshi Utsunomiya, Kawasaki (JP); Hideyuki Kitani, Kawasaki (JP); Kiyohiro Tsunekawa, Kawasaki (JP); Shigeki Hirooka, Kawasaki (JP); Shuji Ozawa, Hino (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/736,245

(22) Filed: Oct. 24, 1996

(30) Foreign Application Priority Data

Oct. 25, 1995 (JP) .......................................... 7-277753

(51) Int. Cl.[7] .......................................... G06F 15/00

(52) U.S. Cl. .................................. 358/1.16; 358/1.14

(58) Field of Search .......................... 399/27, 10, 106, 399/111, 113, 115; 395/115; 347/86; 358/1.16, 1.11, 1.13, 1.17, 1.14, 1.1, 1.9, 1.15, 1.18, 1.4

(56) References Cited

U.S. PATENT DOCUMENTS 5,017,962 A * 5/1991 Tsuji et al. ................ 399/120
5,235,384 A * 8/1993 Oka et al. ..................... 399/27
5,351,073 A * 9/1994 Kageyama et al. ........... 347/87
5,572,292 A * 11/1996 Chatani et al. ............... 399/25
5,596,390 A * 1/1997 Sawada ......................... 399/8
5,610,635 A * 3/1997 Murray et al. ................ 347/7
5,636,032 A * 6/1997 Springett .................... 358/296
5,760,795 A * 6/1998 Beck ............................. 347/3
5,828,863 A * 10/1998 Barrett et al. .............. 395/500
6,106,093 A * 8/2000 Nagoshi et al. ............... 347/15

* cited by examiner

*Primary Examiner*—Gabriel Garcia
(74) *Attorney, Agent, or Firm*—Fitzpatrick, Cella, Harper & Scinto

(57) ABSTRACT

An output apparatus includes a cartridge which contains a recording material. A detector is provided in the apparatus for detecting the remaining amount of the recording material in the cartridge. A controller is provided in the apparatus for storing the cumulative consumed amount of the recording material in a non-volatile memory unit. Thus, the remaining amount of the recording material is determined.

10 Claims, 9 Drawing Sheets

33

| SHOP | PART | LIFE | MADE | OPENED | EXPIRATION | TONER USE (ERROR, COEFFICIENT, AVERAGE, BY DAY, MONTH, PAGE UNIT) | SHEET | NO. OF TONER LOW EVENTS OR FLAGS | TEL |
|---|---|---|---|---|---|---|---|---|---|
| ×× | CARTRIDGE | 2 YEARS | 98.9.8 | 2001.6.8 | 2002.9.8 | 9000dots/day/page $\rho = 0.8$ | HIGHLY ADSORPTIVE | 0 | 0721-××○-△×○○ |
| | | | | | | | | | |

FIG. 8

33

| SHOP | PART | LIFE | MADE | OPENED | EXPIRATION | TONER USE (ERROR, COEFFICIENT, AVERAGE, BY DAY, MONTH, PAGE UNIT) | SHEET | NO. OF TONER LOW EVENTS OR FLAGS | TEL |
|---|---|---|---|---|---|---|---|---|---|
| ×× | CARTRIDGE | 2 YEARS | 98.9.8 | 2001.6.8 | 2002.9.8 | 9000dots/day/page $\rho = 0.8$ | HIGHLY ADSORPTIVE | 0 | 0721-××○-△×○○ |
| | | | | | | | | | |

METHOD AND APPARATUS FOR DETERMINING CONSUMED AMOUNT OF RECORDING MATERIAL

BACKGROUND OF THE INVENTION

1. Field of the Invention

The present invention relates to an output apparatus such as a printer connected to a host computer through a bidirectional interface, and a method therefor.

2. Related Background Art

A printer always requires certain consumable materials. For example an ink jet printer requires ink sealed in an ink cartridge. Also an output apparatus for forming an image on a sheet by the electrophotographic technology utilizes toner for color development. In the following description, such consumable materials, including ink, will be exemplified by toner. As the toner is consumed in the printing operation, it has to be replenished by the user. For facilitating such toner replenishing operation, the toner packaged in a cartridge is widely employed in recent printing apparatus. When the toner in the cartridge is used up, the user removes the empty toner cartridge from the printing apparatus and replaces it with a new toner cartridge.

As the printing operation can naturally be no longer executed when the toner is used up, a warning mechanism is often employed to provide the user with a prior warning before the toner is completely exhausted. For example a mechanical sensor, provided in the toner cartridge, detects a low remaining amount of the toner and displays a warning on the liquid crystal display of the printing apparatus or sends a status signal to the host computer, thereby giving the user a warning through the monitor of the host computer.

Recognizing such prior warning, the user can take various measures such as preparing or purchasing a toner cartridge, avoiding the output operation for a large job, or increasing the density of the output image.

Also in case the printing apparatus has to discriminate the toner cartridges of different kinds, the shape of such cartridge is made partly different according to the kinds and such difference is detected by a mechanical sensor provided in the printing apparatus.

However, such conventional method of mechanically detecting the remaining toner amount is capable of detecting that the remaining toner amount has reached a certain level, but is associated with a drawback that the remaining amount thereafter or the running-out time of the toner cannot be known at all.

SUMMARY OF THE INVENTION

In consideration of the foregoing, an object of the present invention is to exactly recognize or estimate the remaining amount of the recording material until it becomes completely exhausted.

Another object of the present invention is to provide the user with a warning for the low remaining amount of the recording material, in a form convenient and easily understandable to the user.

The above-mentioned objects can be attained, according to the present invention, by an output apparatus for effecting printing operation utilizing a cartridge of the recording material, the apparatus comprising detection means for detecting the remaining amount in the cartridge, a recording material cartridge provided with non-volatile memory means, and control means for recognizing the remaining amount of the recording material by storing the cumulative consumed amount of the recording material in the non-volatile memory means of the recording material cartridge.

The above-mentioned objects can be attained, according to the present invention, by an output apparatus comprising control means which obtains the consumed amount of the recording material from the cumulative number of the used dots.

The above-mentioned objects can be attained, according to the present invention, by an output apparatus comprising calculation means which obtains the cumulative consumed amount of the recording material by estimating the consumed amount of the recording material per dot according to whether the recording material is used in each dot, and, if used, whether the recording material is used in an adjacent dot, among the entire dots on a sheet, thereby estimating the total consumed amount of the recording material per sheet, and by accumulating the consumed amount of the recording material of the different pages.

The above-mentioned objects can be attained, according to the present invention, by an output apparatus comprising control means for obtaining the cumulative consumed amount of the recording material, for characters, by multiplying the average dot number per font provided in the output apparatus with the number of characters in each font, and, for the fonts for which the average dot number per font is not available and for non-character images, by counting the number of used dots.

The above-mentioned objects can be attained, according to the present invention, by an output apparatus comprising control means which compares the anticipated consumed amount of the recording material with the actual consumed amount when the remaining amount of the recording material becomes actually low in the recording material cartridge, then stores the error information in the non-volatile memory means of the cartridge and incorporates such error information in the subsequent estimation of the consumed amount of the recording material, thereby achieving exact estimation of the consumed amount thereof.

The above-mentioned objects can be attained, according to the present invention, by an output apparatus comprising control means which in advance stores information on the average consumed amount of the recording material per page for each kind of sheet and obtains the consumed amount of the recording material by multiplying each kind of sheet with the number of pages.

The above-mentioned objects can be attained, according to the present invention, by an output apparatus comprising control means which estimates the consumed amount of the recording material from the number of the low remaining states of the recording material in the recording material cartridge.

The above-mentioned objects can be attained, according to the present invention, by an output apparatus comprising control means which in advance stores information, for each component of the recording material cartridge, on the number of sheets for which such component is usable, in the non-volatile memory means of the recording material cartridge, and which is adapted to provide a warning that each component has been used for such number of sheets.

The above-mentioned objects can be attained, according to the present invention, by an output apparatus comprising control means which has plural warnings depending on the remaining amount of the recording material and adapted to suitably provide such plural warnings.

The above-mentioned objects can be attained, according to the present invention, by an output apparatus comprising control means capable of providing a warning, such as for the absence of the recording material, in different timings, according to the frequency of use of the printing apparatus.

The above-mentioned objects can be attained, according to the present invention, by an output apparatus comprising control means capable of providing a warning, such as for the absence of the recording material, in different timings, according to the consumed amount in each page.

The above-mentioned objects can be attained, according to the present invention, by an output apparatus comprising control means capable of releasing, at the absence of the recording material, an arbitrary message stored in the non-volatile memory means of the recording material cartridge.

The above-mentioned objects can be attained, according to the present invention, by an output apparatus comprising control means capable storing the actual consumed amount of the recording material in the non-volatile memory means of the recording material cartridge and transmitting the stored content in response to a user operation on the printing apparatus or a request from the host computer.

The above-mentioned objects can be attained, according to the present invention, by an output apparatus comprising control means which stores the expiry date of the recording material in the non-volatile memory means thereof and generates a warning when the expiry date of the cartridge is reached.

The above-mentioned objects can be attained, according to the present invention, by an output apparatus comprising control means which stores the date information, when the recording material cartridge is first used, in the non-volatile memory means thereof and generates a warning when the life of the cartridge expires after such first use.

BRIEF DESCRIPTION OF THE DRAWINGS

FIG. 8 is a table showing information stored in a memory 33; and

DESCRIPTION OF THE PREFERRED EMBODIMENTS

Prior to the description of embodiments of the present invention, there will be explained, with reference to FIG. 1, the configuration of a laser beam printer suitable for use in such embodiments. It is to be noted, however, that such embodiments are applicable not only to the laser beam printer or the ink jet printer, but naturally also to the printers of other printing systems.

Figure 1:
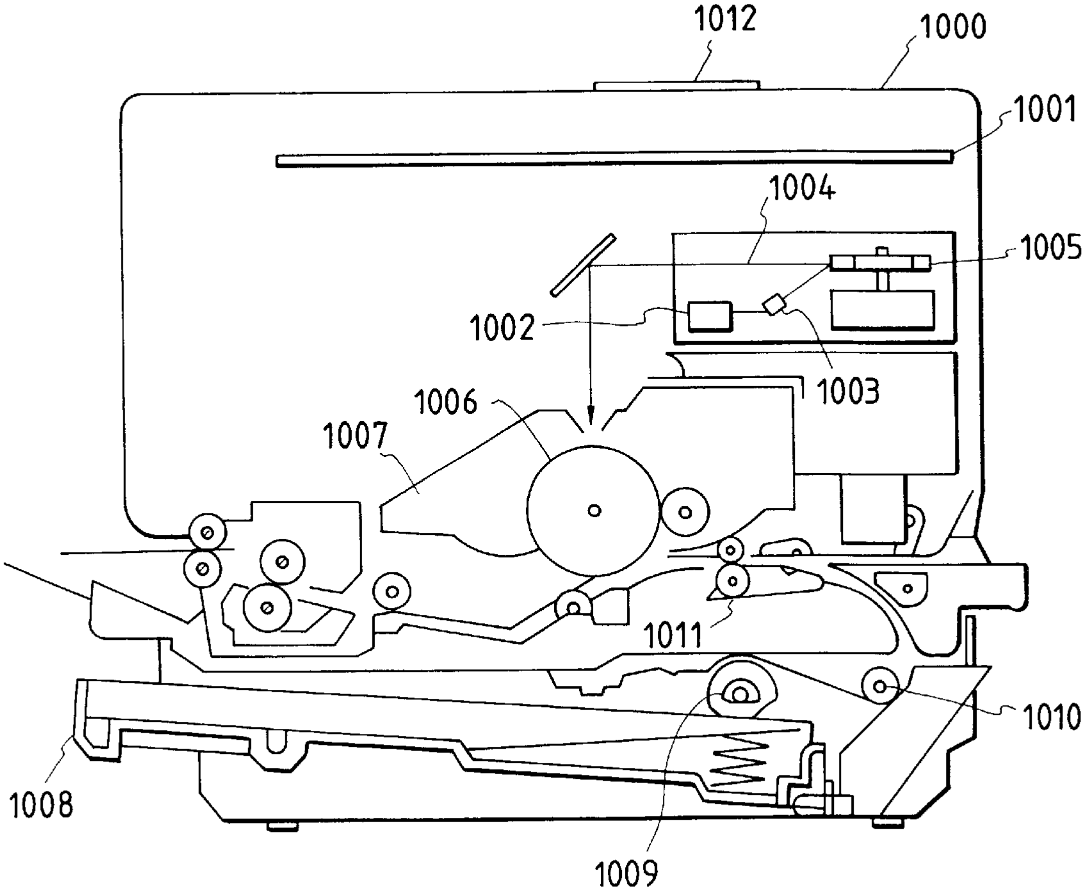
FIG. 1 is a cross-sectional view showing the configuration of a first output apparatus in which the present invention is applicable.

FIG. 1 is a cross-sectional view showing the configuration of a first output apparatus in which the present invention is applicable, for example a laser beam printer (LBP).

Referring to FIG. 1, a main body 1000 of the laser beam printer is capable of accepting and storing the print information (character codes etc.), form information and macro instructions supplied from an externally connected host computer, generating character patterns and form patterns according to such information and recording an image on a recording medium such as a recording paper. An operation panel 1012 is provided with operation switches, a liquid crystal display etc. A printer control unit 1001 controls the entire main body 1000 of the laser beam printer and also analyzes the character information etc. supplied from the host computer. The printer control unit 1001 converts principally the character information into a video signal of corresponding character patterns, for supply to a laser driver 1002. The laser driver 1002, for driving a semiconductor laser 1003, effects on-off switching of the laser beam 1004 emitted from the semiconductor laser 1003, according to the input video signal. The laser beam 1004 is laterally deflected by a rotary polygon mirror 1005, and scans an electrostatic drum 1006, whereby an electrostatic latent image of the character pattern is formed thereon. The latent image is developed, by a developing unit 1007 provided around the electrostatic drum 1006, into a visible image which is then transferred onto a recording sheet. The recording sheet, which is in a cut sheet form, contained in a sheet cassette 1008 mounted on the LBP 1000, is supplied into the LBP by a feed roller 1009 and transport rollers 1010, 1011, and is supplied to the electrostatic drum 1006. The main body 1000 of the LBP is provided with at least an unrepresented card slot for accepting a card for the optional font, in addition to the incorporated fonts, and a control card (emulation card) for a different language system.

The electrostatic drum 1006 and the developing unit 1007 are incorporated in a toner cartridge 32, which is also provided with non-volatile memory means 33 for storing, for example, the consumed amount of the toner.

Figure 2:
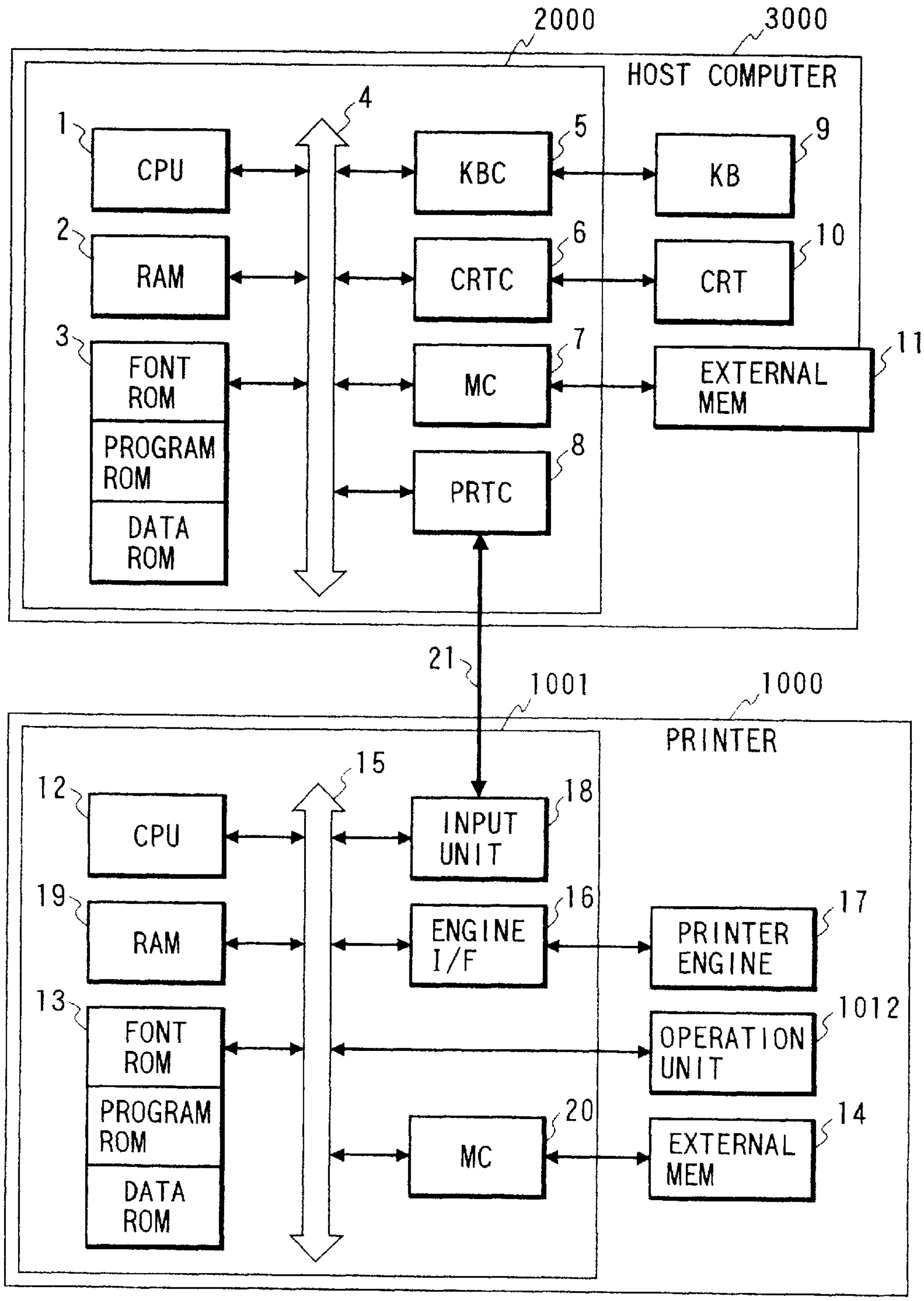
FIGS. 2 and 3 are block diagrams of a printer control system constituting embodiments of the present invention.

FIG. 2 is a block diagram showing the configuration of a printer control system constituting an embodiment of the present invention. The following description will be based on the laser beam printer shown in FIG. 1. However, the present invention is naturally applicable to a single apparatus, or a system consisting of plural equipment, or a system effecting the process through a network such as a LAN, as long as the function of the present invention can be realized.

Referring to FIG. 2, a host computer 3000 is provided with a CPU 1 for processing a document mixedly containing characters, tables, images and patterns based on a document processing program stored in a program ROM in a ROM 3. The CPU 1 also controls the devices connected to a system bus 4.

Figure 5:
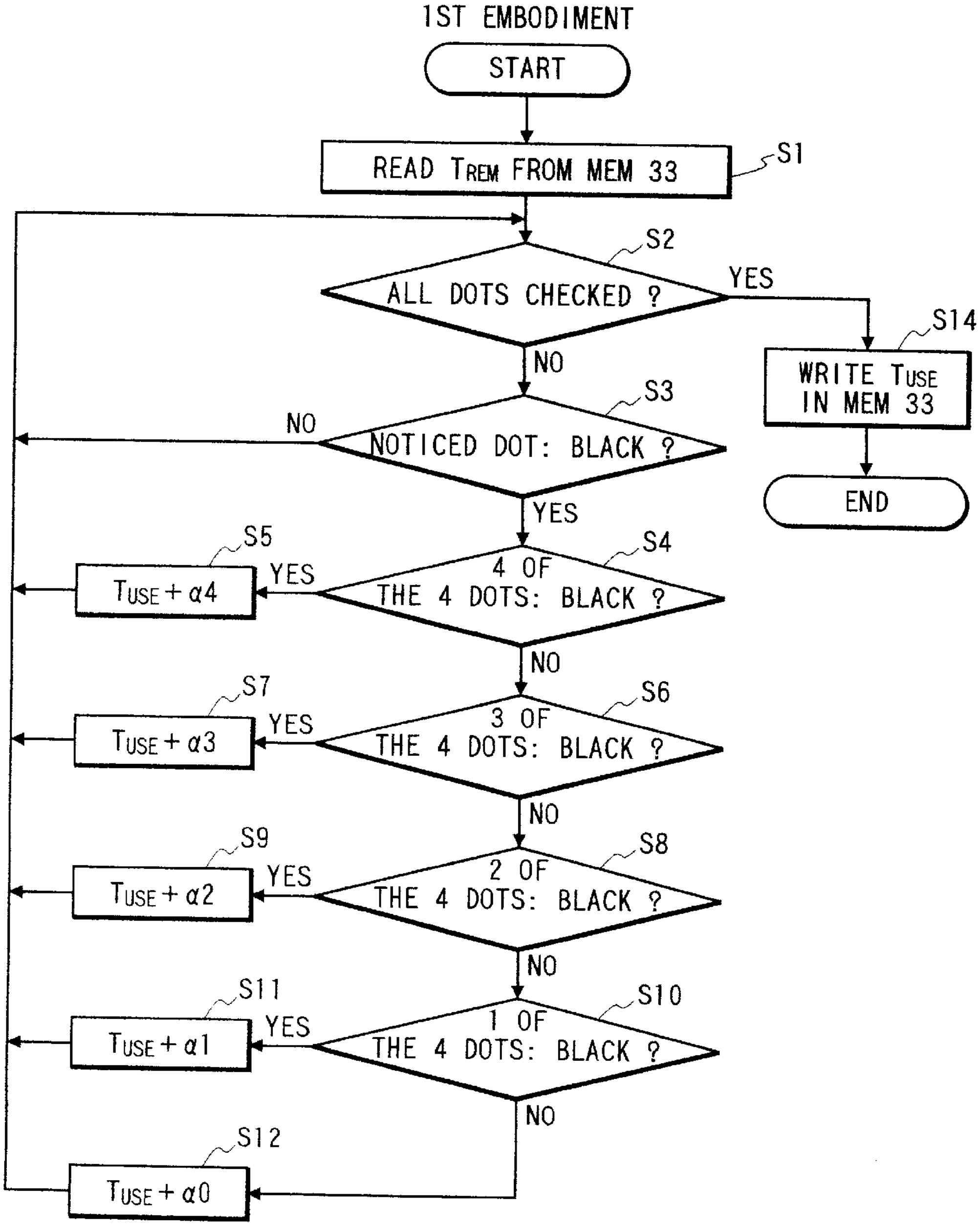
FIGS. 5, 6 and 7 are flow charts showing embodiments of the present invention.
Figure 6:
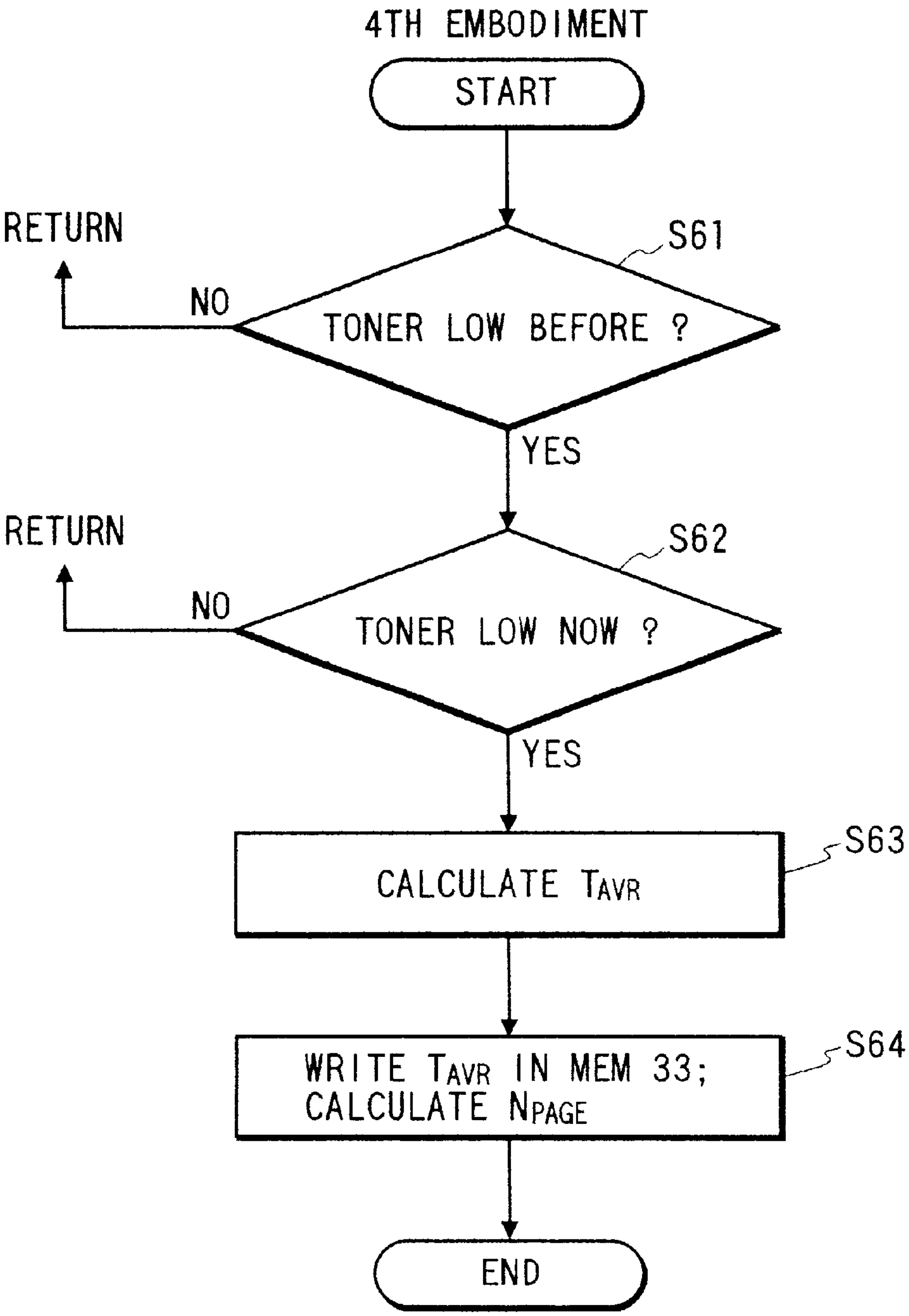
Figure 7:
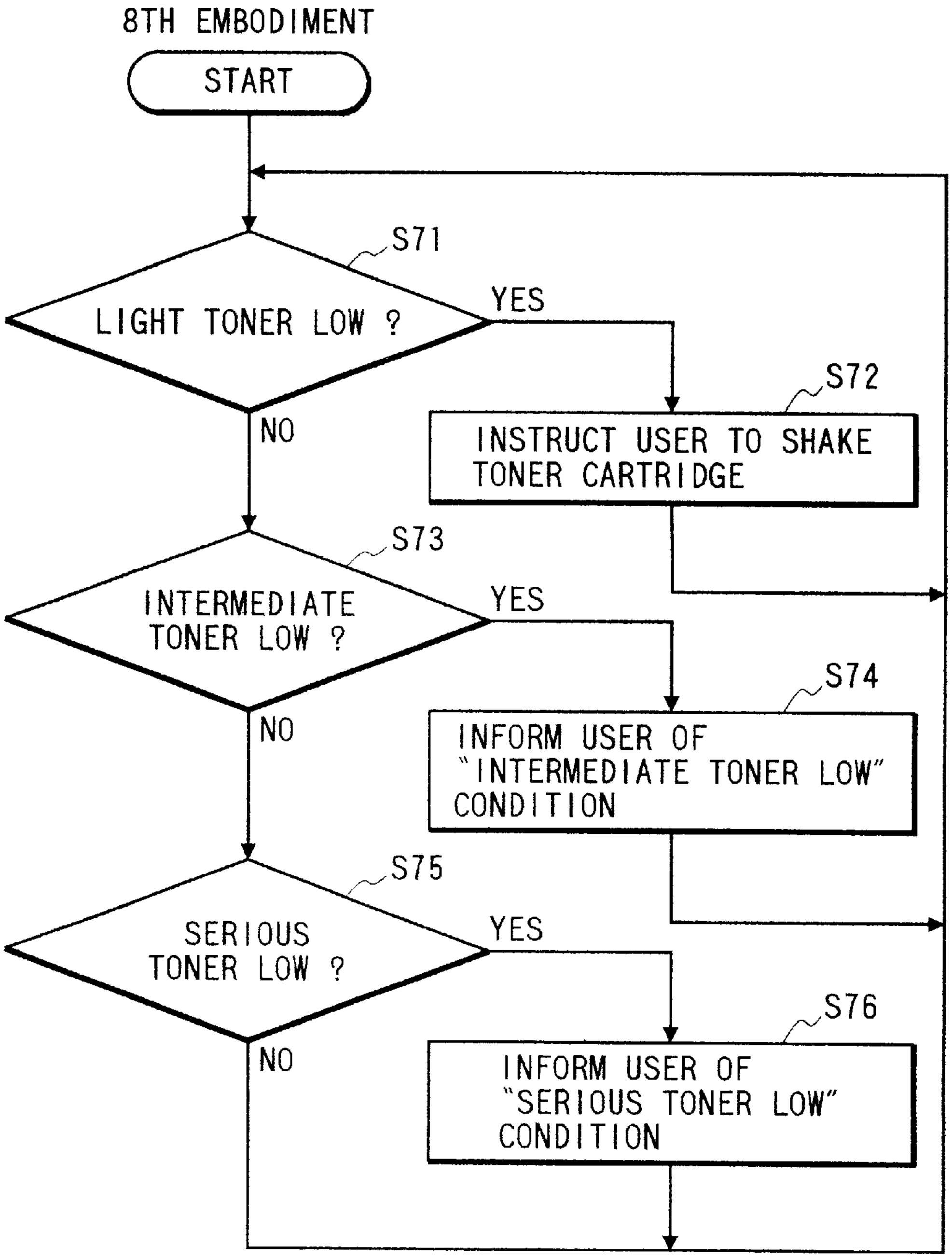

In the above-mentioned ROM 3, the program ROM for example stores control programs for the CPU 1, as shown by flow charts in FIGS. 5, 6 and 7. A font ROM stores font data to be used in the above-mentioned document processing, and a data ROM stores various data to be used in such document processing. There are also provided a RAM 2 to be used as a main memory and a work area for the CPU 1; a keyboard controller (KBC) 5 for controlling the key inputs from the keyboard 9 or an unrepresented pointing device; a CRT controller (CRTC) 6 for controlling the display on a CRT display 10; a memory controller (MC) 7 for controlling access to an external memory 11, such as a hard disk (HD) or a floppy disk (FD), for storing a boot program, various applications, font data, user files, editing files etc.; and a printer controller (PRTC) 8, connected to a printer 1000 through a predetermined bidirectional interface 21, for controlling the communication with the printer 1000. The CPU 1 executes development (rasterization) of the outline font for example into a display information RAM defined on the RAM 2, thereby enabling WYSIWYG on the CRT 10. Also the CPU 10 executes various data processing by opening various registered windows, in response to commands designated for example by a mouse cursor displayed on the CRT 10.

In the printer 1000, a printer CPU 12 comprehensively controls the access to various devices connected to a system bus 15, based on the control programs stored in the program ROM of a ROM 13 or in an external memory 14, and sends output image signals to printing unit (printer engine) 17 connected through a printer engine interface 16. In the ROM 13, the program ROM stores the control programs for the CPU 12, as shown by flow charts in FIGS. 5, 6 and 7. A font ROM stores font data to be used in the generation of the above-mentioned output information, and a data ROM for example stores information to be used on the host computer, in case of a printer not equipped with the external memory 14 such as a hard disk. The CPU 12 is so constructed as to be capable of communication with the host computer through an input unit 18, thereby capable of informing the host computer 3000 of the information in the printer. A RAM 19, to be used as a main memory and a work area of the CPU 12, can be expanded in capacity, by an optional RAM to be connected to an unrepresented expansion port. The RAM 19 is used, for example, as an area for developing the output information, an area for storing the environmental data and a NVRAM. The external memory 14, such as a hard disk (HD) or an IC card, is access controlled by a memory controller (MC) 20. It is connected as an option and is used for storing font data, emulation programs, form data etc. An operation panel 1012 is provided with operation switches, LED displays etc. as explained before.

The above-mentioned external memory is not limited to one unit. There may be connected plural units of such external memory for storing optional fonts in addition to the incorporated fonts, or printer control languages of a different language system. Also there may be provided an unrepresented NVRAM, for storing the printer mode set from the operation panel 1012.

Figure 3:
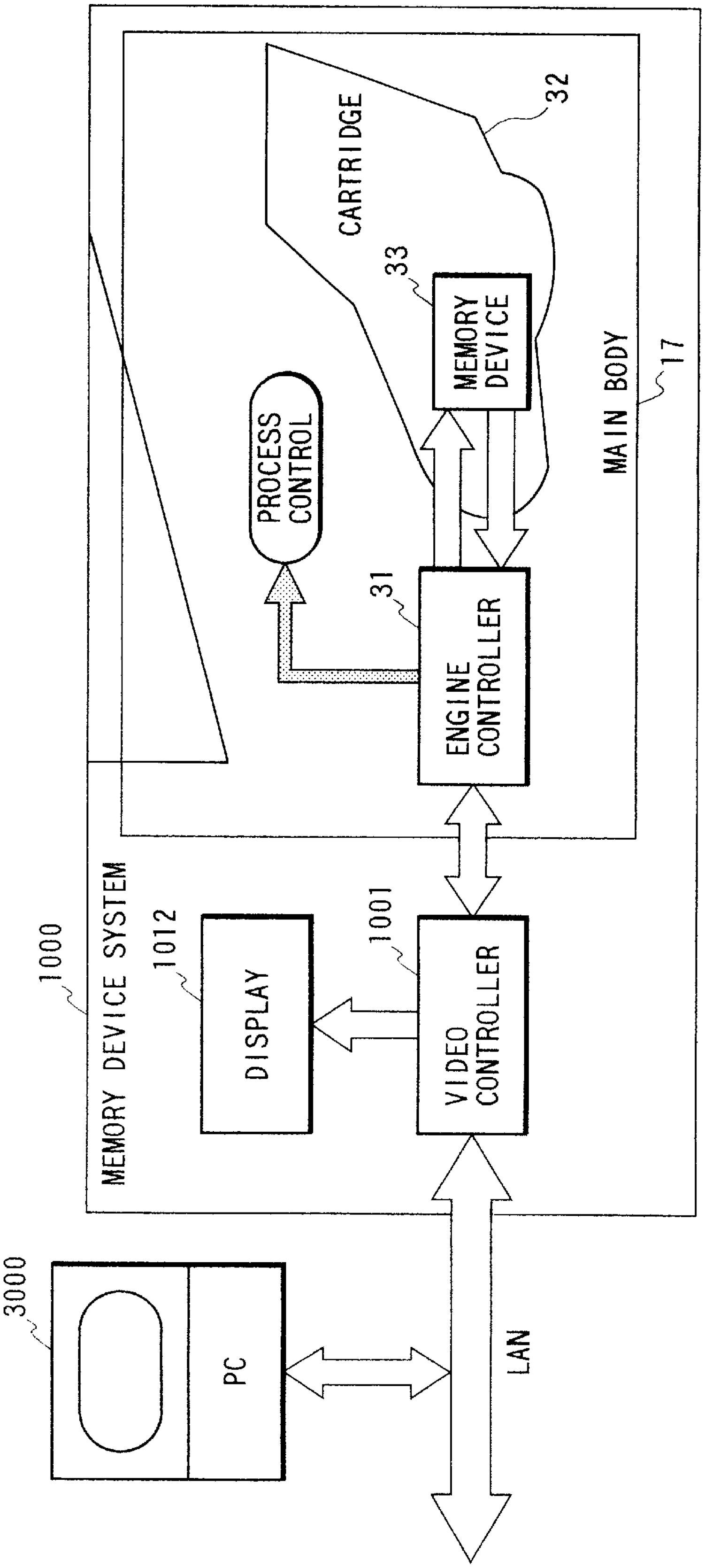

FIG. 3 is another block diagram showing the configuration of the printer control system embodying the present invention, particularly showing the details of the printer engine 17 shown in FIG. 2. The printer 1000 is connected with the host computer 3000 and the data transmitted therefrom are received by a video controller 1001 in the printer. An output image, drawn by the video controller, is formed on the recording sheet through an engine controller 31 in the printer engine 17. The video controller 1001 writes in and reads from the non-volatile memory 33 attached to the toner cartridge, through the engine controller 31. The non-volatile memory 33 may be provided on the board of the video controller 1001 shown in FIG. 3 or may be provided both on the board and on the toner cartridge.

In such printer control system of the above-explained configuration, the remaining amount of the toner is memorized in the non-volatile memory of the toner cartridge for exact control of the remaining toner amount. Also, based on such exact remaining toner amount, a warning on the remaining toner amount is given to the user for example through the operation unit of the host computer or the printer.

First Embodiment

(Determination of Consumed Toner Amount Based on Dot Position)

Figure 4:
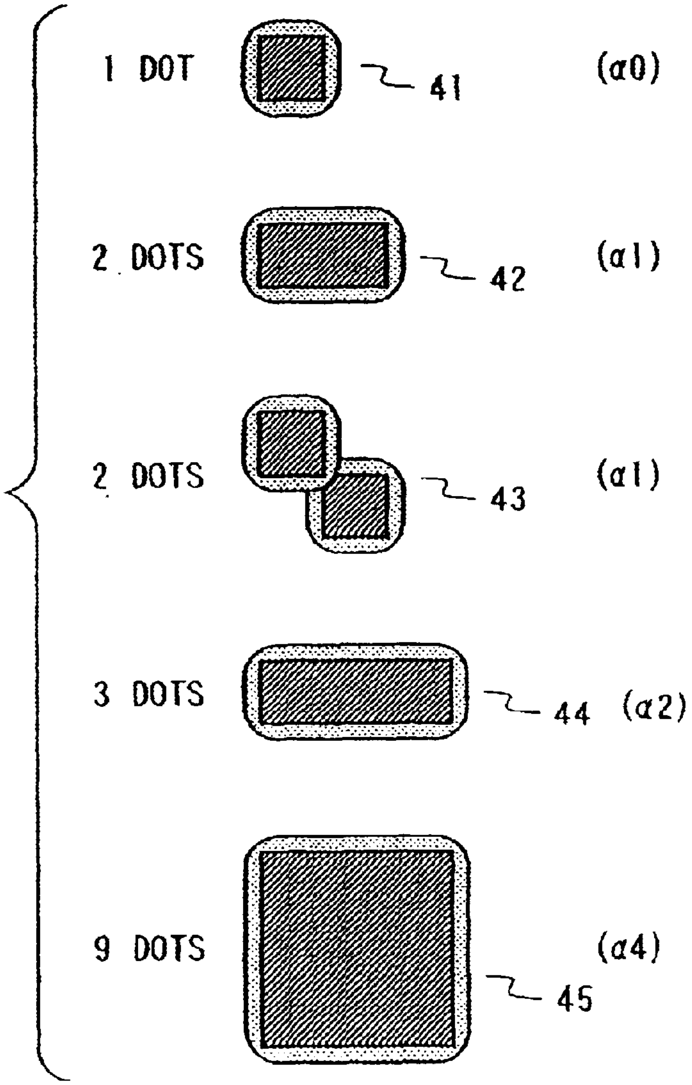
FIG. 4 is a view showing the spreading of toner in dots in an embodiment of the present invention.

FIG. 4 is a schematic view showing the spreading of toner for the purpose of explaining an embodiment of the present invention.

In FIG. 4, 41 is a magnified view of a black dot, having one dot size. Since the toner overflows from the dot boundary, the black area is larger than the square dot boundary. 42 indicates a black dot of a size of two adjacent square dots. As in the dot 41, the actual black area is larger than the dot boundary, but, because the overflowing black areas mutually overlap, the toner amount consumed in the dot 42 is less than double of that consumed in the dot 41. On the other hand, another dot 43 is also of a size of two square dots, but, because of a smaller overlapping of the adjacent dots, the toner amount consumed in the dot 43 is close to double of that consumed in the dot 41. Similarly, in a dot 44, consisting of three adjacent square dots, the toner consumption is less than 3 times of that in the dot 41 consisting of a single square dot and less than 3/2 times of that in the dot 42 consisting of two square dots. Also in case of a dot 45, the toner consumption is less than three times of that in the dot 44, though the number of square dots is tripled (9 square dots). Thus, there is defined the toner consumption per dot by $\alpha$4 if the vertically and horizontally adjacent four dots are all black, $\alpha$3 if three dots among such four adjacent dots are black, $\alpha$2 if two dots are black, $\alpha$1 if one dot is black, and $\alpha$0 in case of an isolated dot. Naturally there stands a relation:

$$\alpha 0 > \alpha 1 > \alpha 2 > \alpha 3 > \alpha 4.$$

The video controller 1001 calculates the consumed amount of toner utilizing this relation, according to an algorithm shown in FIG. 5. This algorithm checks, over an entire page, whether each dot is black, and, if black, whether it is adjacent to other black dots. At first a step S1 reads the remaining toner amount $T_{REM}$ from the non-volatile memory 33 attached to the cartridge. The non-volatile memory 33 stores the initial toner amount when the cartridge is initially sold. A next step S2 discriminates whether all the dots have been checked. If not, a step S3 discriminates whether an object dot is a black dot. If not, the discrimination is continued on a next dot. If it is a black dot, the sequence proceeds to a step S4 to discriminate whether four adjacent dots, positioned vertically and horizontally, are all black. If all black, a step S5 judges that the toner consumption of this dot is $\alpha$4 and stores it as the toner usage $T_{USE}$ of this page in a work area of the RAM 19. If not all black, the sequence proceeds to a step S6 to discriminate whether three dots among the vertically and horizontally adjacent four dots are black. If so, the sequence proceeds to a step S7 to add the toner consumption $\alpha$3 of this dot to the toner usage $T_{USE}$. If the discrimination of the step S6 turns out negative, the sequence proceeds to a step S8 to similarly discriminate whether two dots among the four adjacent dots are black. If so, a step S9 adds the toner consumption $\alpha$2 to the toner usage, but, if not, the sequence proceeds to a step S10 to discriminate whether one dot, among the four adjacent dots, is black. If so, a step S11 adds $\alpha$1 to the toner usage, but, if not, a step S12 adds $\alpha$0. The sequence returns from a step S13 to S2 to continue the discrimination on a next dot. If the step S2 identifies that all the dots have been checked, the sequence proceeds to a step S14 to write the toner consumption of this page in the non-volatile memory 33 of the toner cartridge. For example, as shown in FIG. 8, the data indicating the toner consumption for each page is recorded in a predetermined area in the memory 33.

In the foregoing description, the discrimination is made on whether the dot is black or not, but the present invention is naturally not limited to the case of black dots. As will be evident in case of a color printer, the color of toner is not limited to black.

Second Embodiment (Determination of Toner Consumption From the Number of Dots Constituting Font)

The printing apparatus has information, for each font provided therein, on the average number of black dots per character of each size. Such information is transmitted to the host computer 3000, which, at the printing operation, searches the document to be printed and calculates the average number of black dots from the character size and the number of characters. For the image elements that do not have the information of the average number of black dots, such as image, graphics and fonts provided in the host computer, the number of dots is counted. In this manner the approximate number of black dots can be obtained with a smaller amount of calculation, in comparison with the simple counting of the black dots. The data thus obtained is memorized, as shown in FIG. 8, in the predetermined area of the memory 33.

In the foregoing description, the discrimination is made on whether the dot is black or not, but the present invention is naturally not limited to the case of black dots. As will be evident in case of a color printer, the color of toner is not limited to black.

Third Embodiment (Error Correction in Case of Low Toner State)

The exact toner consumption can be calculated according to the first and second embodiments. However the actual toner consumption is somewhat different from the theoretical value, for example depending on the temperature and humidity of the location of use.

In the present embodiment, the non-volatile memory 33 of the toner cartridge is provided with areas for storing a coefficient for correcting the error between the theoretical value and the actual past value, the count of the pages for which the toner cartridge is used or the cumulative dot number for which the toner cartridge is used, and a flag indicating whether a low toner state has been generated before.

When the low toner state is generated, the cumulative count of black dots or the actual page count is compared with the theoretical design value, and a coefficient for correcting the error therebetween is memorized in the non-volatile memory 33 as shown in FIG. 8.

In the foregoing description, the discrimination is made on whether the dot is black or not, but the present invention is naturally not limited to the case of black dots. As will be evident in case of a color printer, the color of toner is not limited to black.

Fourth Embodiment (Derivation of Toner Usage Per Page)

The "low toner" state is detected by a sensor provided in the toner cartridge and is transmitted to the video controller 1001 through the engine controller 31. The detection of such low toner state means that the remaining toner amount is estimated to have reached a certain amount that is predetermined at the designing.

In the present embodiment, the non-volatile memory 33 in the toner cartridge 32 is provided, as shown in FIG. 8, with areas for storing "page counter" and "average toner consumption per page", and "a flag indicating whether the low toner state has been generated in this toner cartridge".

FIG. 6 is a flow chart showing the control sequence of the present embodiment. At first a step S61 discriminates whether the low toner state has been generated in the cartridge currently in use. If generated, the sequence proceeds to a step S62 to discriminate whether the low toner state is currently present. The repetition of the steps S61 and S62 allows to detect the initially generated low toner state. In case the low toner state is generated, the sequence proceeds to a step S63 to calculate the "average toner consumption per page" $T_{AVE}$ according to the following equation:

(toner amount at the start of use)−(designed remaining toner amount)/(number of printed pages with this cartridge)

The remaining toner amount at the detection of the initial low toner state is obtained by a theoretical average value (design value). A step S64 memorizes the average toner consumption in the non-volatile memory 33 as shown in FIG. 8.

Thereafter, the "number of remaining printable pages $N_{PAGE}$" can be easily obtained from the value of the page counter and the average consumption.

It may be displayed on the operation unit 1012 of the printing apparatus or may be transmitted to the host computer 3000 and displayed thereon, for information to the user.

Fifth Embodiment (Derivation of Toner Consumption According to Paper)

The toner consumption varies depending on the kind of the paper used. Certain paper consumes more toner per unit number of black dots, and certain paper consumes less. This embodiment is to determine the remaining toner amount more exactly, according to the selection of paper by the user.

The user enters the kind of the paper, utilizing the display and keyboard of the host computer 3000, or the operation unit 1012 of the printing apparatus 1000.

In the Third embodiment, in the calculation of the toner consumption by the multiplication of the average toner consumption per page with the number of pages, it is possible to obtain the toner consumption in more accurate manner by weighting the number of pages for the paper which consumes more toner on average.

It is also possible to take the paper size into consideration and to consider that a larger sheet consumes more toner per page. The exact toner consumption can also be obtained in this manner. The toner consumption, obtained in consideration of the kind of paper, is memorized in the predetermined area of the memory 33, as shown in FIG. 8.

Sixth Embodiment (Storage of Number of Low Toner States)

In general, the detection of the low toner state can be temporarily relieved by shaking the toner cartridge, because such cartridge shaking uniformly "levels" the toner which is localized in the cartridge. The low toner state will be detected again in such relieved toner cartridge after it is used for a while. The low toner state will be continuously detected after a certain number of such cycles, and eventually the toner will be completely exhausted.

It is therefore possible to memorize the number of relieved low toner states in the non-volatile memory 33, as shown in FIG. 8.

Such number allows the user to judge whether the cartridge is still usable by shaking or whether it is close to the end of the service life.

Seventh Embodiment (Derivation of Service Life of Parts of Cartridge)

At the shipment of the toner cartridge, the service life of each component (number of sheets for which the component can be used) of the toner cartridge is recorded in the non-volatile memory 33 thereof as shown in FIG. 8.

The printing apparatus can provide the user with a warning when any of the components reaches such number. Such program is stored in the ROM 13 as explained before.

This embodiment is particularly effective in case the cartridge is used for a prolonged period for some reason.

Eighth Embodiment (Determination of the Level of Low Toner State)

Based on the foregoing embodiments, the printing apparatus or the host computer can determine the exact remaining amount of the toner. The present embodiment classifies the level of the low toner state, based on such exact remaining toner amount, thereby providing the user with suitable display or the like according to such level.

FIG. 7 is a flow chart representing the details of the present embodiment. In the following there will be explained an example of processing in the printing apparatus, but a similar process may also be executed in the host computer.

At first a step S71 discriminates whether the low toner state of a relatively light level has been generated in the printing apparatus, based on the number of the low toner states generated. If such low toner state is generated, a step S72 requests that the user shake the cartridge, by a display either on the operation unit 1012 of the printing apparatus or on the monitor of the host computer 3000. If the low toner state of the light level is not generated, the sequence proceeds to a step S73 to discriminate whether the low toner state of a medium level has been generated (for example by a warning for a low toner state subsequent to the shaking twice of the cartridge after the initial low toner state). If such low toner state is generated, the user is given a warning that the remaining toner amount is considerably low, by a display either on the operation unit 1012 of the printing apparatus or on the monitor of the host computer 3000 as in the step S72. If such low toner state of the medium level is not generated either, the sequence proceeds to a step S75 to discriminate whether the low toner state of a serious level has been generated. If generated, the sequence proceeds to a step S76 to provide a display as in the step S72 or S74. If the user intends to carry out the printing operation, the host computer 3000 may request the confirmation of the user for such operation, in addition to the display of the warning.

Ninth Embodiment

In this embodiment, the status of the remaining toner amount, exactly determined in the foregoing embodiments, is returned to the host computer 3000 either periodically, or in response to a request for the status, or at a timing designated by the user or by the host computer 3000, and the host computer 3000 displays such status either periodically, or continuously, or at a timing designated by the user through an application a utility program or the operation panel of the printing apparatus. Otherwise the driver program or the printing apparatus automatically changes the timing of the display, so as to be most convenient for the user, according to the state or frequency of use, the content of printing or the level of low toner state.

Figure 9:
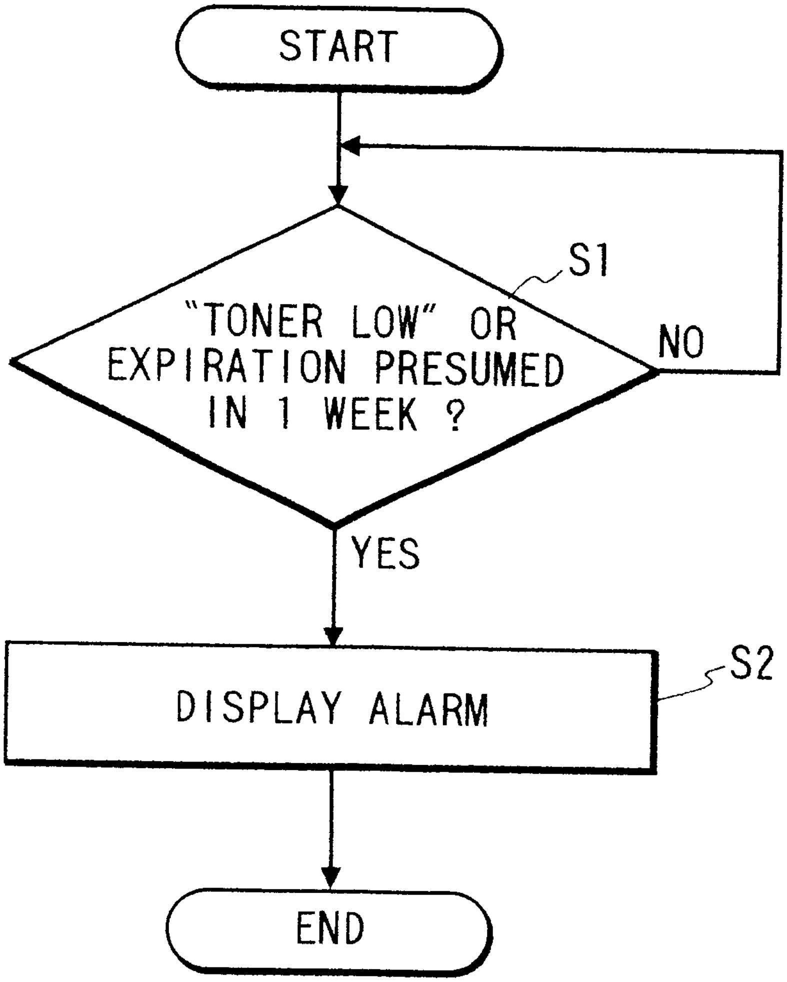
FIG. 9 is a flow chart showing an embodiment of the present invention.

As an example, in a flow chart shown in FIG. 9, the average toner consumption per day is derived for example in consideration of the kind of paper as explained in the foregoing, and there is discriminated whether the low toner state (or the expiration of the usable life) is anticipated after a week, based on the opened date of the toner cartridge, the service life of the components, the usable life of the cartridge etc. (S1), and, if anticipated, a corresponding warning is displayed on the host computer or on the printing apparatus (S2). In this embodiment, the display is given when a printing operation is instructed. The timing of the display may however be made selectable by the user. Such control may be contained in the printer driver program or the utility program, contained for example in a floppy disk attached to the printing apparatus. In such case, the present invention also covers the memory medium containing such control program. The one-week period mentioned above is assumed to a sufficient period required for obtaining a new toner cartridge. On the other hand, the toner amount actually remaining at the time of warning may vary, depending on the status of use such as the kind of paper. As an alternative, the warning may be given when the remaining toner reaches a certain predetermined amount. In such case, the toner may run out three days later or two weeks later, depending on the state of use.

Tenth Embodiment (Contact Address in Memory)

A contact address, for example the telephone number of the sales agent, is recorded in the non-volatile memory 33 of the toner cartridge, as shown in FIG. 8. When the low toner state is generated, the printing apparatus, the driver program or the utility program displays such contact address on the operation unit 1012 of the printing apparatus or on the host computer.

Eleventh Embodiment (Data Storage for a Predetermined Period)

The toner consumption determined in exact manner as explained in the foregoing is recorded, in a predetermined unit such as per day or per month, in the non-volatile memory 33 of the toner cartridge as shown in FIG. 8, and is transmitted to the host computer in response, for example, to an inquiry therefrom.

Twelfth Embodiment

At the sale of the toner cartridge, the date of manufacture thereof is recorded in the non-volatile memory 33 thereof, as shown in FIG. 8. Based on such date of manufacture, the printing apparatus calculates the limit of use, and, when the limit of use is reached or is approached, effects a display on the operation unit 1012 or a recording on a test print, indicating such situation. Otherwise a display may be made on the monitor of the host computer 3000 through the driver program thereof.

Thirteenth Embodiment

The date of first use of the toner cartridge 32 is recorded in the non-volatile memory 33 thereof, as shown in FIG. 8. This date of first use is considered as the opening date of the cartridge, which is used for determining the limit of use. Such limit of use is informed to the user by a display either on the host computer or on the printing apparatus, and is made recognizable at any time, for example by a test print or by a display through a panel operation.

As explained in the foregoing, the present invention allows to exactly calculate the toner amount and store the toner consumption in the toner cartridge. The toner cartridge may be detached and replaced, but, if it is provided with the non-volatile memory 33 according to the present invention, the video controller 1001 can know the remaining toner amount when the power supply to the printing apparatus is turned on or at an arbitrary timing. The printing apparatus can always know the exact remaining amount of the toner, by calculating the exact toner consumption as explained in the foregoing and renewing the remaining amount for each page. Utilizing such exact remaining toner amount, the printing apparatus can provide the user with the warning for the low toner state in effective manner.

As explained in the foregoing, the present invention allows to estimate the toner consumption more exactly than the estimation based on the counting of the page number, and with a less amount of calculation than the estimation based on the counting of black dots.

As explained in the foregoing, the present invention allows to predict the exhaustion of toner with a reduced error and to provide a warning therefor, by estimating the average toner consumption for each site based on the past result of the printing apparatus.

As explained in the foregoing, the present invention can inform the user of the number of printable pages until the exhaustion of the toner, with a reduced error, by calculation based on the average toner consumption per page before the low toner state, in consideration of the difference in the mode of use for each site.

As explained in the foregoing, the present invention can estimate the toner consumption of a reduced error, in consideration of the difference in the toner consumption according to the kind of paper, thereby providing the user with a warning in more exact manner.

As explained in the foregoing, the present invention allows to predict the timing of exhaustion of toner with a reduced error, based on the number of shakings of the toner cartridge.

As explained in the foregoing, the present invention allows to provide the user with a warning in adequate manner, according the service life of the components of the toner cartridge.

As explained in the foregoing, the present invention allows to determine the level of the low toner state with a reduced error, and to provide the user with a suitable warning matching such level.

As explained in the foregoing, the present invention allows to provide the user with the level of the low toner state or the remaining toner amount either periodically or at a designated timing or at a certain automatic timing, through the display of the printing apparatus or the monitor of the host computer.

As explained in the foregoing, the present invention allows to inform the user of the necessary contact address in appropriate manner when the toner becomes exhausted.

As explained in the foregoing, the present invention allows to easily manage the history of the toner consumption.

As explained in the foregoing, the present invention allows to adequately inform the user of the limit of use of the toner cartridge.

As detailedly explained in the foregoing, the present invention provides an output apparatus comprising a cartridge containing a recording material and further containing a non-volatile memory unit, detection means for detecting the remaining amount of the recording material in the cartridge, and control means for storing the cumulative consumed amount of the recording material in the non-volatile memory unit of the cartridge, thereby determining the remaining amount of the recording material.

Also as explained in the foregoing, the present invention allows to control the timing of the warning based on the consumption of the recording material according to the environment of the apparatus.

What is claimed is:

1. A printing apparatus using a cartridge that contains a recording material and is provided with a non-volatile memory unit, said printing apparatus comprising:

warning means for providing a warning in response to a remaining amount of the recording material becoming low;

control means for controlling the non-volatile memory unit to store time information on a year, a month, and a day on which the cartridge was first used; and calculation means for calculating a lifetime of the cartridge based on the time information stored in the non-volatile memory unit, wherein said warning means provides the warning based on the lifetime of the cartridge calculated by said calculation means.

2. An apparatus according to claim 1, further comprising display control means for controlling a host computer in communication with said printing apparatus to display information on an address of a sales agent stored in the non-volatile memory unit.

3. An apparatus according to claim 1, wherein second time information on a year, a month, and a day on which the cartridge was manufactured is also stored in the non-volatile memory unit, and said warning means provides the warning based on the lifetime of the cartridge calculated based on the time information and the second time information.

4. An apparatus according to claim 1, wherein the recording material comprises a toner, and wherein said apparatus further comprises detection means for detecting the remaining amount of the toner and said warning means informs that the remaining amount of the toner is low, at different levels, in response to a history of occurrences of a toner-low status detected by said detection means.

5. An apparatus according to claim 4, further comprising calculation means for calculating a consumed amount of the toner, wherein, based on the consumed amount of the toner calculated by said calculation means, the remaining amount of the toner can be detected as being low.

6. A method carried out in a printing apparatus using a cartridge that contains a recording material and is provided with a non-volatile memory unit, said method comprising:

a warning step of providing a warning in response to a remaining amount of the recording material becoming low;

a control step of controlling the non-volatile memory unit to store time information on a year, a month, and a day on which the cartridge was first used; and a calculation step of calculating a lifetime of the cartridge based on the time information stored in the non-volatile memory unit, wherein said warning step provides the warning based on the lifetime of the cartridge calculated in said calculation step.

7. A method according to claim 6, further comprising a display control step of controlling a host computer in communication with the printing apparatus to display information on an address of a sales agent stored in the non-volatile memory unit.

8. A method according to claim 6, wherein second time information on a year, a month, and a day on which the cartridge was manufactured is also stored in the non-volatile memory unit, and said warning step provides the warning based on the lifetime of the cartridge calculated based on the time information and the second time information.

9. A method according to claim 6, wherein the recording material comprises a toner, and wherein said method further comprises a detection step of detecting the remaining amount of the toner and said warning step informs that the remaining amount of the toner is low, at different levels, in response to a history of occurrences of a toner-low status detected in said detection step.

10. A method according to claim 9, further comprising a calculation step of calculating a consumed amount of the toner, wherein, based on the consumed amount of the toner calculated in said calculation step, the remaining amount of the toner can be detected as being low.

* * * * *